(12) United States Patent
Masuda et al.

(10) Patent No.: US 8,340,366 B2
(45) Date of Patent: Dec. 25, 2012

(54) FACE RECOGNITION SYSTEM

(75) Inventors: Makoto Masuda, Saitama (JP); Kagehiro Nagao, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1013 days.

(21) Appl. No.: 12/225,423

(22) PCT Filed: Jan. 19, 2007

(86) PCT No.: PCT/JP2007/050802
§ 371 (c)(1),
(2), (4) Date: Sep. 22, 2008

(87) PCT Pub. No.: WO2007/108225
PCT Pub. Date: Sep. 27, 2007

(65) Prior Publication Data
US 2009/0110248 A1 Apr. 30, 2009

(30) Foreign Application Priority Data
Jun. 23, 2006 (JP) .................................. 2006-079844

(51) Int. Cl.
*G06K 9/00* (2006.01)
(52) U.S. Cl. ........................................ 382/118; 382/117
(58) Field of Classification Search ........................ None
See application file for complete search history.

(56) References Cited

U.S. PATENT DOCUMENTS

| | | | | |
|---|---|---|---|---|
| 5,982,912 | A * | 11/1999 | Fukui et al. | 382/118 |
| 7,440,593 | B1 * | 10/2008 | Steinberg et al. | 382/118 |
| 2002/0184538 | A1 * | 12/2002 | Sugimura et al. | 713/202 |
| 2003/0103652 | A1 | 6/2003 | Lee | |
| 2003/0198368 | A1 * | 10/2003 | Kee | 382/118 |
| 2004/0062423 | A1 | 4/2004 | Doi | |
| 2006/0146062 | A1 * | 7/2006 | Kee et al. | 345/582 |

(Continued)

FOREIGN PATENT DOCUMENTS

JP 2000-163600 6/2000
(Continued)

OTHER PUBLICATIONS

Yukio Yoshida et al., "Face Identification Using Auto-extracted Feature Points and Gabor Transformation", Technical Report of IEICE, PRMU2001-202, The Institute of Electronics, Information and Communication Engineers. Refers to in p. 8 of spec.

(Continued)

*Primary Examiner* — Andrew W Johns
*Assistant Examiner* — Siamak Harandi
(74) *Attorney, Agent, or Firm* — Rabin & Berdo, P.C.

(57) ABSTRACT

A face recognition system includes: an image input section that acquires a facial image of a user; a database in which a feature value of a part of a face of a registered person is stored; a facial position detection section that detects a position of a part of a face from the facial image of the user; a feature value extraction section that extracts a feature value of the part of the face; and a recognition section that recognizes the user by comparing the feature value of the part of the face which is extracted by the feature value extraction section with the feature value of the part of the face of the registered person stored in the database, in which the user selects the part of the face from which the feature value is extracted.

2 Claims, 4 Drawing Sheets

U.S. PATENT DOCUMENTS

2007/0052726 A1* 3/2007 Wright et al. .............. 345/629
2007/0098231 A1* 5/2007 Minato ..................... 382/118

FOREIGN PATENT DOCUMENTS

| | | |
|---|---|---|
| JP | 2003-050783 | 2/2003 |
| JP | 2003-132339 A | 5/2003 |
| JP | 2003-281539 | 10/2003 |
| JP | 2003-331264 A | 11/2003 |
| JP | 2004-118627 | 4/2004 |

OTHER PUBLICATIONS

Takeshi Agui et al., "Computer Image Processing and Recognition," Shokodo Co., Ltd., 1996, pp. 103-105.

Hiroshi Kage et al., "Evaluation of Occlusion-Tolerant Face Authentication Using Auto-Associative Memory", The Institute of Electronics, Information and Communication Engineers (IEICE) Technical Report, vol. 105, No. 457, Japan, IEICE, Dec. 2, 2005, pp. 49-54.

* cited by examiner

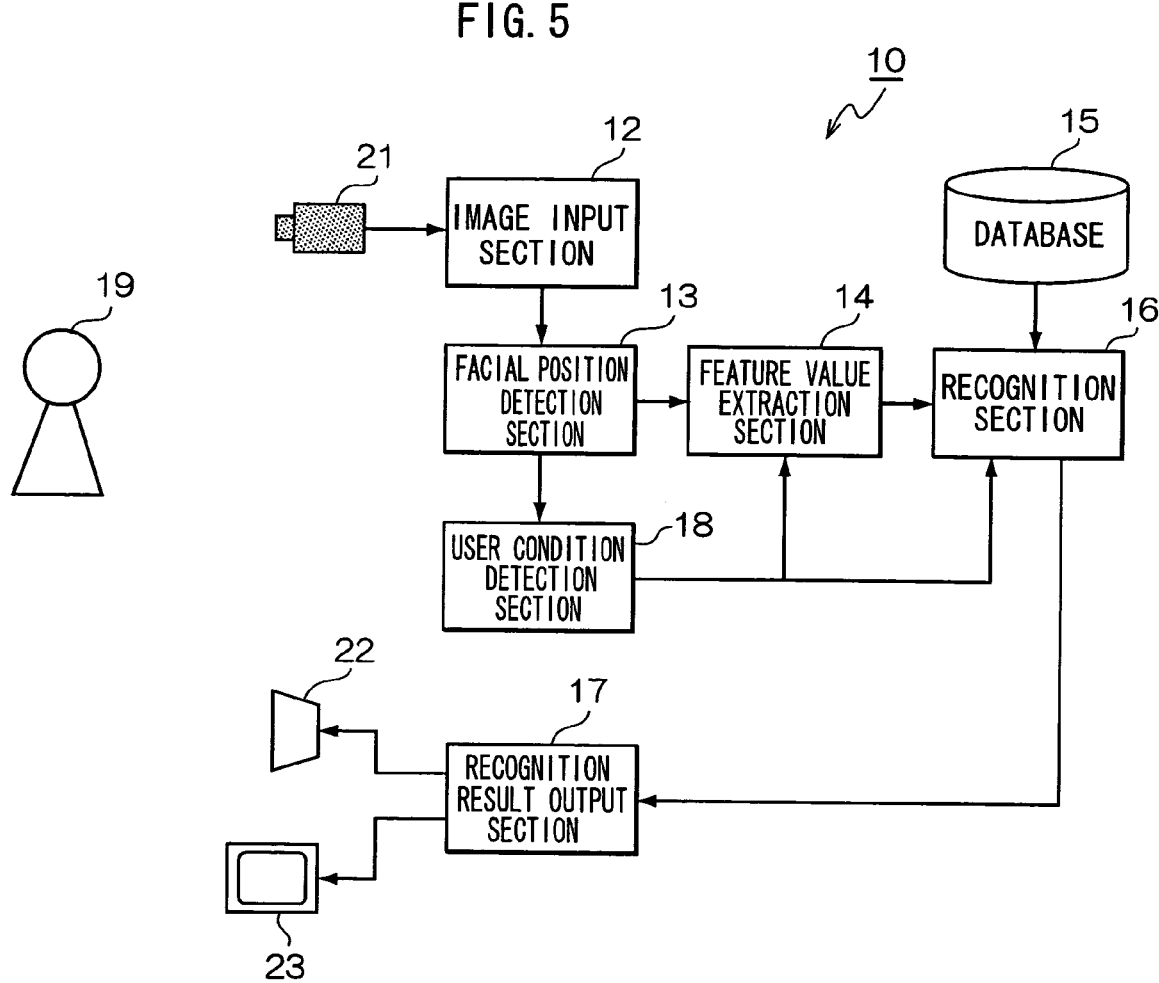

FACE RECOGNITION SYSTEM

TECHNICAL FIELD

The present invention relates to a face recognition system.

BACKGROUND ART

In a known personal authentication apparatus for preventing an unauthorized person from approaching a building or a specific place within the building, a known personal authentication apparatus for preventing an unauthorized person from operating an apparatus, such as an information processing apparatus, or a known personal authentication apparatus for identity verification in electronic commerce using Internet, a personal authentication apparatus using a biometrics authentication system that performs identity verification using a biological feature of a person without using a key or a personal identification number is provided (for example, refer to Patent Document 1).

In addition, in personal authentication apparatuses using the biometrics authentication system, a system that performs authentication by a fingerprint, a system that performs authentication by a voiceprint, a system that performs authentication by a face, and the like are used.

A system that performs authentication by a face, that is, a face recognition system is configured to perform recognition by extracting a feature value of a face from a facial image and comparing the similarity with a feature value registered beforehand when face recognition is performed. In this case, the positions of both eyes and the mouth are detected and thereby face recognition is performed by template matching processing in which a modified template is set as a feature value of a face. At this time, it is a prerequisite that the facial image includes both eyes and the mouth. When either detection of both eyes or detection of the mouth has failed, it is determined that a face does not exist in the image and an alarm is given.

Patent Document 1: JP-A No. 2000-163600

DISCLOSURE OF THE INVENTION

Problem to be Solved by the Invention

In the known face recognition system, however, a mouth cannot be detected if a user wears a mask and accordingly, the face recognition cannot be properly performed. For example, when influenza is prevailing in winter or a pollen allergy is prevailing in spring, users wear masks in many cases. In such a case, in the personal authentication apparatus using the known face recognition system, a feature value of a mouth changes a lot due to an effect of the mask. As a result, identity verification of the user fails since the face recognition system cannot properly recognize the face which wears the mask. For this reason, since the user should take off the mask at the time of authentication, it takes time and the user feels it troublesome.

In order to solve the problems of the known face recognition systems, it is an object of the present invention to provide a face recognition system that includes a feature value selection section, which selects a part of a face from which a feature value is extracted, such that a user who performs face recognition can select a part of a face from which a feature value is extracted by himself or herself and thus can properly perform face recognition by prioritizing a feature value of a selected part and reducing feature values of the other parts even in the case where the user wears a mask or an eye bandage or the hairstyle has changed.

Means for Solving Problem

Therefore, a face recognition system of the present invention includes: an image input section that acquires a facial image of a user; a database in which a feature value of a part of a face of a registered person is stored; a facial position detection section that detects a position of a part of a face from the facial image of the user; a feature value extraction section that extracts a feature value of the part of the face; and a recognition section which recognizes the user by comparing the feature value of the part of the face, which is extracted by the feature value extraction section, with the feature value of the part of the face of the registered person stored in the database, and wherein the user selects the part of the face from which the feature value is extracted.

Further, in another aspect of the face recognition system of the invention, the facial position detection section detects only the position of the part of the face selected by the user.

In still another aspect of the face recognition system of the invention, a feature value selection section that is operated by the user in order to select the part of the face from which the feature value is extracted is further included.

Still another face recognition system of the invention includes: an image input section that acquires a facial image of a user; a database in which a feature value of a part of a face of a registered person is stored; a facial position detection section that detects a position of a part of a face from the facial image of the user; a feature value extraction section that extracts a feature value of the part of the face; and a recognition section which recognizes the user by comparing the feature value of the part of the face, which is extracted by the feature value extraction section, with the feature value of the part of the face of the registered person stored in the database, and wherein the part of the face from which the feature value is extracted is automatically selected according to a user condition.

In still another aspect of the face recognition system of the invention, a user condition detection section that selects the part of the face, from which the feature value is extracted, by matching the facial image of the user with a registered template is further included.

Effect of the Invention

According to the present invention, the feature value selection section that selects the part of the face from which the feature value is extracted is included in the face recognition system. Therefore, since the user who performs face recognition can select the part of the face from which the feature value is extracted by himself or herself, face recognition can be properly performed by prioritizing the feature value of the selected part and reducing feature values of the other parts even in the case where the user wears a mask or an eye bandage or the hairstyle has changed.

BRIEF DESCRIPTION OF DRAWINGS

FIG. 5 is a view illustrating the configuration of a face recognition system in a second embodiment of the invention.

BEST MODE FOR CARRYING OUT THE INVENTION

Hereinafter, an embodiment of the present invention will be described in detail with reference to the accompanying drawings.

Figure 1:
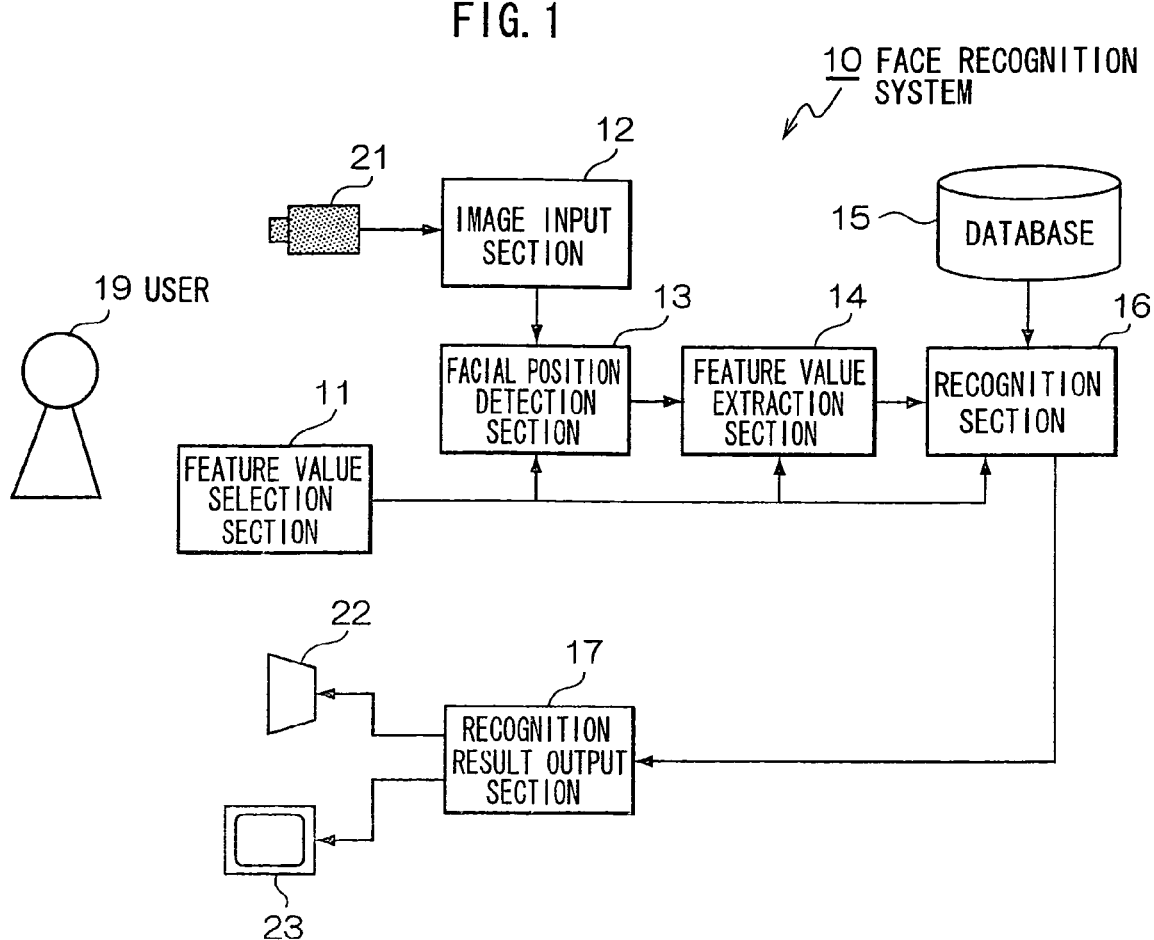
FIG. 1 is a view illustrating the configuration of a face recognition system in a first embodiment of the present invention.

FIG. 1 is a view illustrating the configuration of a face recognition system in a first embodiment of the invention.

In the drawing, 10 is a face recognition system which performs face recognition by acquiring a facial image of a user 19 photographed by a camera 21 and is a kind of computer system which operates according to a program. The face recognition system 10 is a system used to perform personal authentication of the user 19 by a face of the user 19, which is one of the biological features of the user 19, and may be used in any kind of application. For example, the face recognition system 10 is used for identity verification when entering a specific building, such as an apartment, a factory, and an office, or a specific place within the building. In addition, the face recognition system 10 may also be used for identity verification of a person who has an airline ticket at the time of check-in in an airport. In addition, the face recognition system 10 may also be used for identity verification when financial transaction is requested at the windows of business offices of banking facilities, such as a bank, a post office, and a credit bank, or when financial transaction is performed by operating an automatic transaction apparatus, such as an ATM (automatic teller machine). In addition, the face recognition system 10 may also be used for identity verification in electronic commerce using Internet.

In addition, the user 19 may be a resident or a worker of a specific building, such as an apartment, a factory, and an office, or a specific place within the building, may be a traveler who performs check-in at the airport, may be a client who requests financial transaction at the windows of business offices of banking facilities or performs financial transaction by operating an automatic transaction apparatus, or may be a person who performs electronic commerce using Internet, and anyone who performs identity verification using the face recognition system 10 may be the user 19.

In addition, the camera 21 includes an imaging device, such as a CCD (charge coupled device) or a CMOS (complementary metal oxide semiconductor), an optical lens, a communication interface, and the like. As long as the camera 21 can be connected to the face recognition system 10 and output a photographed image in the form of electronic data, the camera 21 may be a digital still camera which photographs a still image or may be a digital camcorder which photographs a moving picture, and may be a thing of what kind of form, that is, any kind of camera may be used. For example, the camera 21 may be a surveillance camera provided at the entrance of a specific building or a specific place within the building, may be a built-in camera built in an automatic transaction apparatus, may be a camera connected to a personal computer or the like, or may be a camera built in a notebook type personal computer, a PDA (personal digital assistant), an electronic diary, a mobile phone, a PHS (personal handy-phone system) phone, and the like.

In addition, the face recognition system 10 includes: a feature value selection section 11 that selects parts of a face from which a feature value of a face used for face recognition is extracted; an image input section 12 that acquires a facial image for each single frame from the camera 21; a facial position detection section 13 that detects parts of the face of the user 19 from an image acquired by the image input section 12, for example, the positions of the eyes, the mouth, and the like; a feature value extraction section 14 that extracts feature values of the parts, such as the eyes and mouth, as feature values of the face used for face recognition; a database 15 in which a feature value of a face of a registered person registered beforehand is stored; a recognition section 16 that recognizes a person in the image by comparing a feature value of each registered person stored in the database 15 with the feature value extracted by the feature value extraction section 14; and a recognition result output section 17 that outputs a recognition result of the recognition section 16. In addition, the parts of a face from which feature values used for face recognition are extracted are the eyes, mouth, ears, nose, and the like. However, any part of a face may be used as long as identity verification can be made by using a biological feature of the part. Here, explanation will be made assuming that the parts are the eyes and mouth.

Here, the feature value selection section 11 is a means used when the user 19 selects a part of a face from which a feature value is extracted according to the situation. For example, the feature value selection section 11 can make a selection so as to prioritize a feature value of the eyes in the case when the user 19 wears a mask and to use feature values of the eyes and mouth in other cases, that is, when the user 19 does not wear a mask.

In addition, the image input section 12 is communicably connected to the camera 21 as a photographing means for photographing a facial image of the user 19 through a cable network or a wireless network and acquires the facial image of the user 19 from the camera 21. In addition, it is preferable that the facial image be digital image data. In addition, the network may be a communication cable, such as a USB (universal serial bus) cable, or may be a communication network, such as a telephone network, Internet, a LAN (local area network), or a WAN (wide area network).

In addition, the recognition result output section 17 is communicably connected to a speaker 22 and a monitor 23 through a cable network or a wireless network and creates a message and image for outputting a recognition result to the speaker 22 or the monitor 23. Here, the speaker 22 may be any kind of speaker and may be disposed in any place. For example, the speaker 22 may be a speaker, such as an interphone, provided at the entrance of a specific building or a specific place within the building, may be a built-in speaker built in an automatic transaction apparatus, may be a speaker connected to a personal computer or the like, or may be a speaker built in a notebook type personal computer, a PDA, an electronic diary, a mobile phone, a PHS phone, and the like.

In addition, the monitor 23 has a display means, such as a CRT, a liquid crystal display, or an LED (light emitting diode) display, and the monitor 23 may be any kind of monitor and may be disposed in any place. For example, the monitor 23 may be a monitor provided at the entrance of a specific building or a specific place within the building, may be a display means of an automatic transaction apparatus, may be a monitor connected to a personal computer or the like, or may be a monitor provided in a notebook type personal computer, a PDA, an electronic diary, a mobile phone, a PHS phone, and the like.

In addition, the network may be a communication cable, such as a USB cable, or may be a communication network, such as a telephone network, Internet, a LAN, or a WAN.

In addition, the face recognition system 10 may be one included in any kind of computer as long as the face recognition system 10 includes an operating means, such as a CPU or an MPU, a storage means such as a semiconductor memory or a magnetic disk, an input/output interface, and the like. For example, the face recognition system 10 may be one included in a personal computer, may be one included in a server, or may be one included in a computer network in which a plurality of computers are connected to one another by a network.

Next, an operation of the face recognition system 10 having the above configuration will be described.

Figure 2:
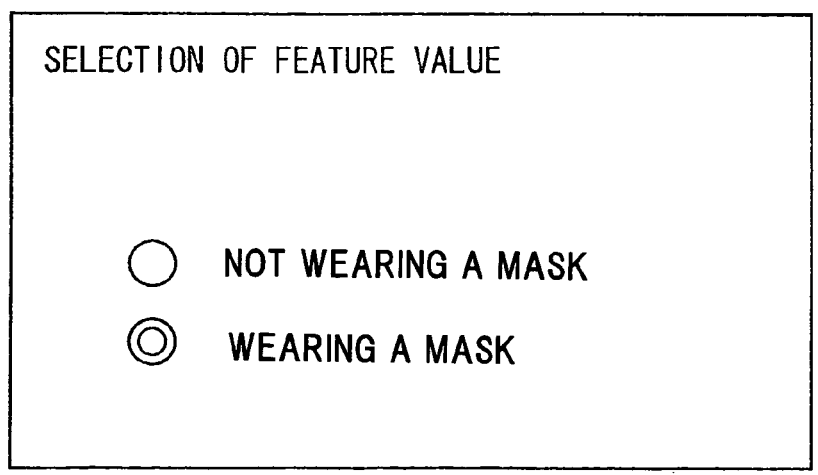
FIG. 2 is a view illustrating an example of a feature value selection screen in the first embodiment of the invention.
Figure 3:
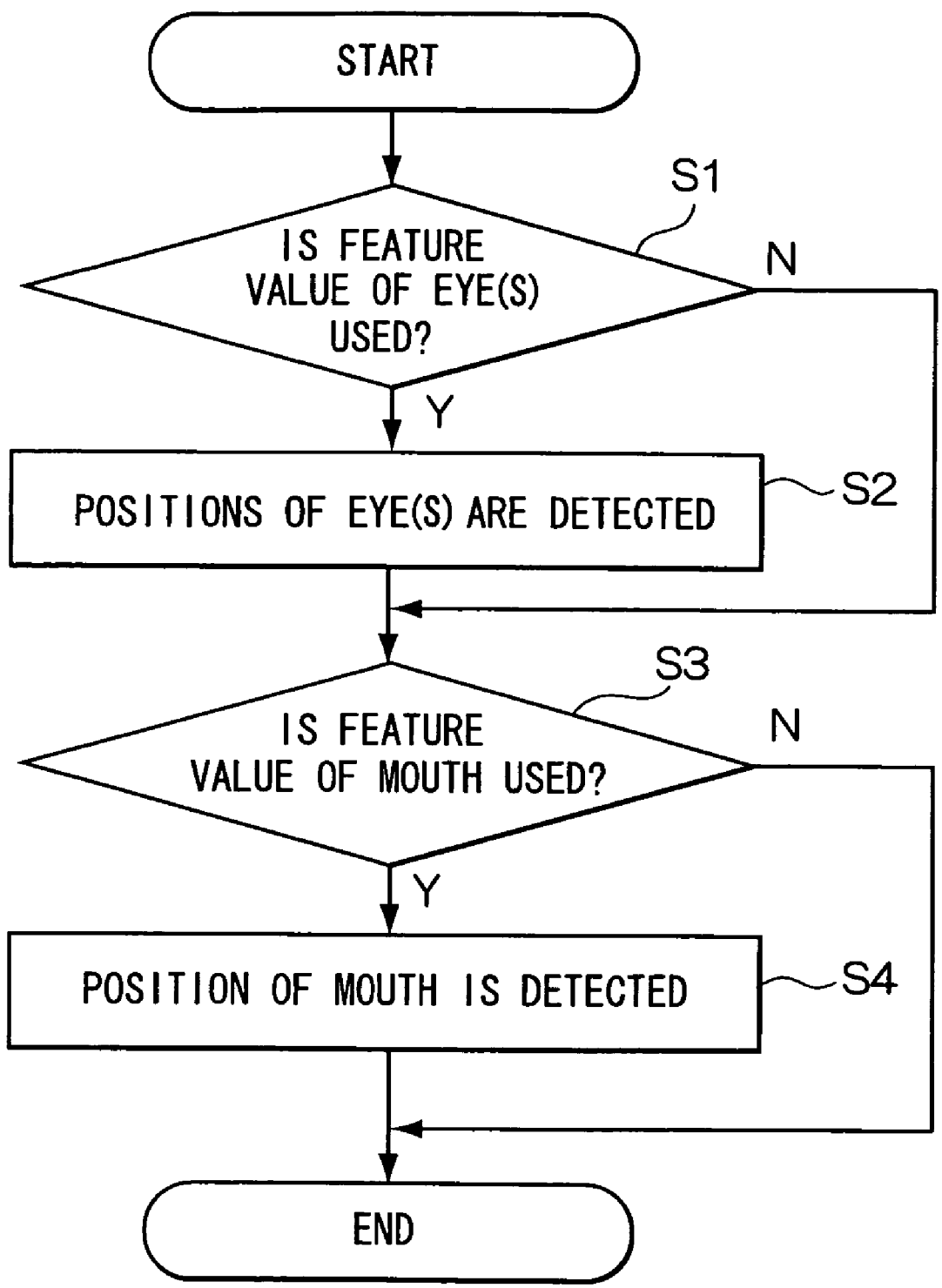
FIG. 3 is a flow chart illustrating an operation of facial position detection processing in the first embodiment of the invention.
Figure 4:
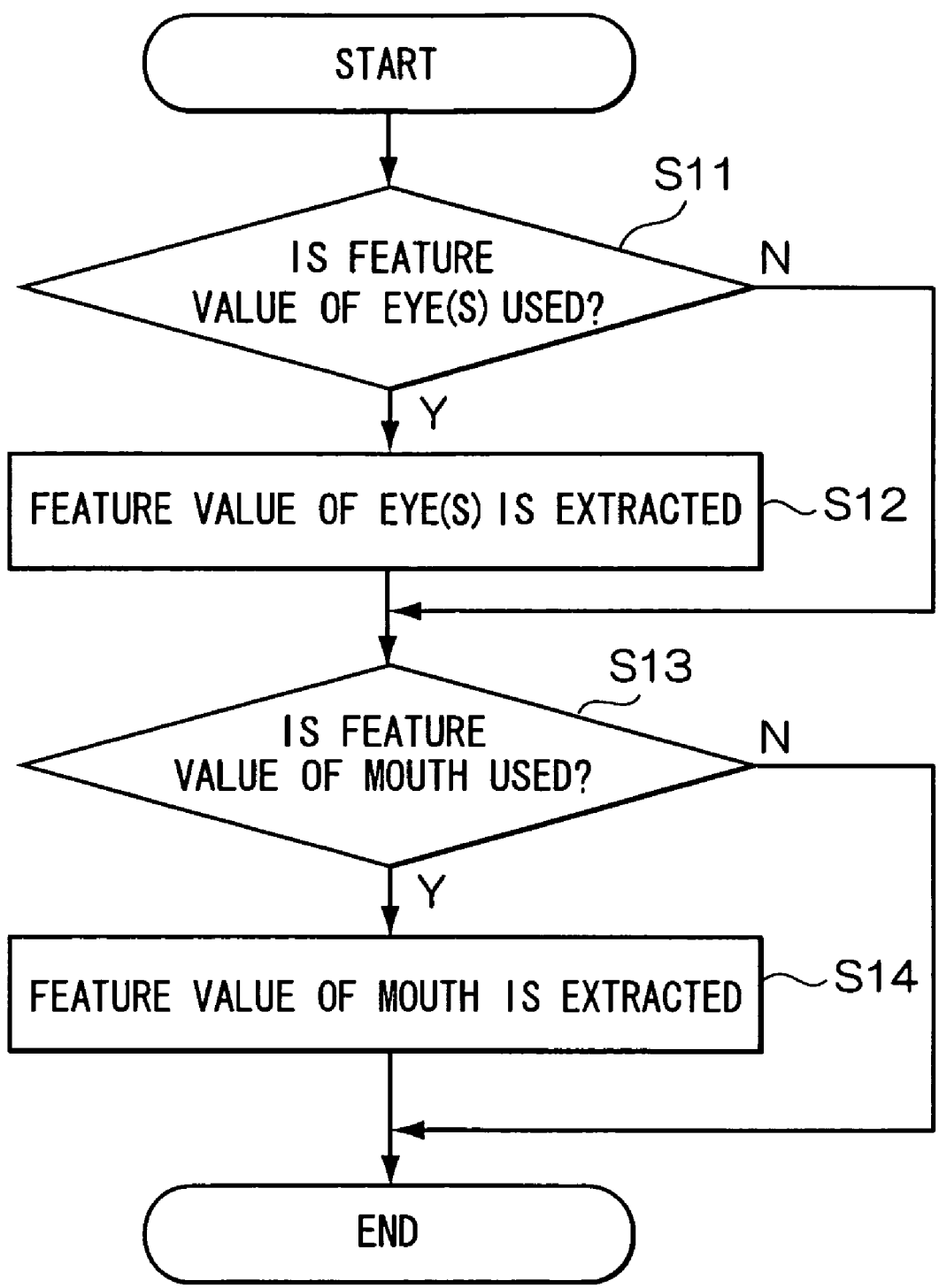
FIG. 4 is a flow chart illustrating an operation of a feature value extraction processing in the first embodiment of the invention.

FIG. 2 is a view illustrating an example of a feature value selection screen in a first embodiment of the invention, FIG. 3 is a flow chart illustrating an operation of facial position detection processing in the first embodiment of the invention, and FIG. 4 is a flow chart illustrating an operation of a feature value extraction processing in the first embodiment of the invention.

First, by means of the feature value selection section 11, the user 19 selects from which part of a face a feature value will be extracted, that is, selects which part of the face will be regarded as important for the feature value of the face. In this case, the face recognition system 10 displays, for example, the feature value selection screen shown in FIG. 2 on the monitor 23 such that the user 19 selects whether or not the user 19 wears a mask. Then, in the case when it is selected that a mask is worn, using a feature value of the eye or eyes (hereinafter "the eye(s)") as the feature value of the face is assumed to be selected. In addition, in the case when it is selected that a mask is not worn, using feature values of the eye(s) and a mouth is assumed to be selected.

Moreover, similarly, it is also possible to cause the user 19 to select whether or not the user 19 wears an eye bandage. Then, in the case when it is selected that an eye bandage is worn, using a feature value of a mouth as the feature value of the face is assumed to be selected. In addition, in the case when it is selected that an eye bandage is not worn, using feature values of the eye(s) and a mouth is assumed to be selected. Moreover, similarly, it is also possible to cause the user 19 to select whether or not the hairstyle has changed a lot.

Then, the image input section 12 acquires a facial image of the user 19 that the camera 21 has photographed for every frame.

Then, the facial position detection section 13 detects the position of each part of the face from the facial image acquired by the image input section 12. In this case, only the position of the part selected by the feature value selection section 11 is detected. For example, in the case of using feature values of the eye(s) and mouth, their positions are sequentially detected. First, it is determined whether or not using the feature value of the eye(s) has been selected. In the case when using the feature value of the eye(s) has been selected, the positions of the eye(s) are detected. In addition, in the case when using the feature value of the eye(s) is not selected, the positions of the eye(s) are not detected. Subsequently, it is determined whether or not using the feature value of the mouth has been selected. In the case when using the feature value of the mouth has been selected, the position of the mouth is detected. In addition, in the case when using the feature value of the mouth is not selected, the position of the mouth is not detected.

Furthermore, as a method of detecting each part of a face, for example, a method of calculating the rough position of a face on the basis of a skin color and then calculating the position of each part by template matching and projection histogram of a filtering result by a low pass filter is known as a face part searching method (for example, refer to Patent Document 2). Accordingly, an explanation thereof will be omitted.

Patent Document 2: JP-A No. 2003-281539

Then, the feature value extraction section 14 extract a feature value used for face recognition. In this case, only a feature value of the part selected by the feature value selection section 11 is extracted as a target. For example, a feature value of the selected eye(s) or mouth is extracted as a target. As a feature value used for face recognition, for example, a method of performing filtering by using a plurality of kinds of Gabor filters for the eyes, nose, and mouth is known (for example, refer to Non-patent Document 1). Accordingly, an explanation thereof will be omitted.

Non-patent Document 1: 'Face Identification Using Autoextracted Feature Points and Gabor Transformation', Yoshida, Wu, Shioyama, the Institute of Electronics, Information, and Communication Engineers, Technical report of IEICE, PRMU2001-202

Furthermore, in the database 15, feature values of faces of one or more registered persons are stored and feature values of all parts (for example, the eyes, mouth, ears, and nose) of a face extracted from a facial image of each registered person are stored.

Then, the recognition section 16 performs face recognition by comparing a feature value, which is extracted from the facial image of the user 19 by the feature value extraction section 14, with the feature value of the face of the registered person stored in the database 15. In this case, regarding a part (for example, the eye(s) or mouth) selected by the feature value selection section 11, the recognition section 16 compares the feature value extracted from the facial image of the user 19 with the feature value of the registered person and calculates a recognition score. In addition, as a pattern matching method in the case of calculating the recognition score, for example, a method of using a normalized cross correlation (for example, refer to Non-patent Document 2) is known. Accordingly, an explanation will be omitted.

Non-patent Document 2: 'Computer Image Processing and Recognition', Agui, Nagao.

Here, the recognition score is calculated for the feature value of each registered person. In addition, when the recognition score is a maximum and exceeds a predetermined threshold value, the recognition section 16 determines that the registered person is the user 19. That is, it is determined that the user 19 is the same person as the registered person and the face recognition has succeeded. In addition, in the other cases, the recognition section 16 determines that the face recognition has failed.

Then, the recognition result output section 17 outputs a recognition result of the recognition section 16, that is, whether the face recognition of the user 19 has succeeded or failed from the speaker 22 and the monitor 23 by means of a sound or an image. As a result, the recognition result can be transmitted to the user 19.

Next, a flow chart shown in FIG. 3 will be described.

In step S1, it is determined whether or not using a feature value of the eye(s) has been selected. In the case when using the feature value of the eye(s) has been selected, the process proceeds to step S2. In the case when using the feature value of the eye(s) is not selected, the process proceeds to step S3.

In step S2, the positions of the eye(s) are detected.

In step S3, it is determined whether or not using a feature value of a mouth has been selected. In the case when using the feature value of the mouth has been selected, the process proceeds to step S4. In the case when using the feature value of the mouth is not selected, the processing is ended.

In step S4, the position of the mouth is detected and the processing is ended.

Next, a flow chart shown in FIG. 4 will be described.

In step S11, it is determined whether or not using a feature value of the eye(s) has been selected. In the case when using the feature value of the eye(s) has been selected, the process proceeds to step S12. In the case when using the feature value of the eye(s) is not selected, the process proceeds to step S13.

In step S12, the feature value of the eye(s) is extracted.

In step S13, it is determined whether or not using a feature value of a mouth has been selected. In the case when using the feature value of the mouth has been selected, the process proceeds to step S14. In the case when using the feature value of the mouth is not selected, the processing is ended.

In step S14, the feature value of the mouth is detected and the processing is ended.

Thus, in the present embodiment, the user 19 can select which part of a face will be regarded as important for a feature value of the face according to the condition of the user 19, such that setting of a feature value can be intentionally set. Accordingly, face recognition of the user 19 can be properly performed even in a state where the user 19 wears a mask, a state where the user 19 wears an eye bandage, and a state where the hairstyle has changed a lot, for example. As a result, since it is not necessary to take off a mask or an eye bandage at the time of authentication, a burden of the user 19 can be alleviated.

Next, a second embodiment of the invention will be described. In addition, an element having the same structure as in the first embodiment is denoted by the same reference numeral, and the explanation will be omitted. In addition, explanations on the same operation and effects as in the first embodiment will also be omitted.

FIG. 5 is a view illustrating the configuration of a face recognition system in the second embodiment of the invention.

As shown in the drawing, a face recognition system 10 in the present embodiment includes an image input section 12, a facial position detection section 13, a feature value extraction section 14, a database 15, a recognition section 16, a recognition result output section 17, and a user condition detection section 18. In addition, the feature value selection section 11 is omitted. In addition, the user condition detection section 18 detects a condition of the user 19 on the basis of a result detected by the facial position detection section 13 and, for example, determines whether or not the user 19 wears a mask. In addition, since the other configurations are the same as those in the first embodiment, the explanation will be omitted.

Next, an operation of the face recognition system 10 in the present embodiment will be described.

First, the image input section 12 acquires a facial image of the user 19 that the camera 21 has photographed for every frame.

Then, the facial position detection section 13 detects the position of each part of the face from the facial image acquired by the image input section 12.

Then, the user condition detection section 18 detects the condition of the user 19 by using information on the position of each part of the face detected by the facial position detection section 13. For example, the position of a mouth is estimated from the positions of the eye(s), and the neighborhood of the position of the estimated mouth is made to match the template of a mouth registered beforehand as registered data. In the case when a cross correlation value between the neighborhood of the position of the estimated mouth and the template of the mouth is equal to or smaller than a predetermined threshold value, the user condition detection section 18 determines that the mouth cannot be seen due to an effect of a mask and makes a selection such that a feature value of the mouth is not used for face recognition.

In addition, similarly, the user condition detection section 18 matches the neighborhood of the positions of the estimated eye(s) with a template of the eye(s) registered beforehand as registered data, for example. In addition, in the case when a cross correlation value between the neighborhood of the positions of the estimated eye(s) and the template of the eye(s) is equal to or smaller than a predetermined threshold value, the user condition detection section 18 determines that the eye(s) cannot be seen due to an effect of an eye bandage or hairstyle and makes a selection such that a feature value of the eye(s) is not used for face recognition.

Then, the feature value extraction section 14 extract a feature value used for face recognition. In this case, only a feature value of the part selected by the user condition detection section 18 is extracted.

Then, the recognition section 16 performs face recognition by comparing a feature value, which is extracted from the facial image of the user 19 by the feature value extraction section 14, with the feature value of the face of the registered person stored in the database 15.

Then, the recognition result output section 17 outputs a recognition result of the recognition section 16, that is, whether the face recognition of the user 19 has succeeded or failed from the speaker 22 and the monitor 23 by means of a sound or an image. As a result, the recognition result can be transmitted to the user 19.

Thus, in the present embodiment, it is possible to automatically select which part of a face will be regarded as important for a feature value of the face according to the condition of the user 19. Accordingly, face recognition of the user 19 can be properly performed even in a state where the user 19 wears a mask, a state where the user 19 wears an eye bandage, and a state where the hairstyle has changed a lot, for example. As a result, since it is not necessary to take off a mask or an eye bandage at the time of authentication, a burden of the user 19 can be alleviated.

In addition, the invention is not limited to the above embodiments but various modifications may be made on the basis of the spirit of the invention, and they are not excluded from the range of the invention.

The invention claimed is:

1. A face recognition system, comprising:
    an image input section that acquires an image showing a face of a user;
    a feature value selection section for manually selecting a part of the face of the user from the acquired image;
    a database storing a plurality of feature values that respectively correspond to a plurality of parts of a face of a registered person, including a part matching the selected part;
    a facial position detection section that detects a position of the selected part of the face of the user from the acquired image;
    a feature value extraction section that extracts a feature value of the selected part of the face of the user; and
    a recognition section that compares the extracted feature value of the selected part of the face of the user in the acquired image with one of the plurality of feature values corresponding to the matching part of the face of the registered person stored in the database, to thereby determine whether the user is the registered person.

2. The face recognition system according to claim 1, wherein the facial position detection section detects only the position of the selected part of the face.

* * * * *